United States Patent [19]

Cearley et al.

[11] Patent Number: 5,247,549
[45] Date of Patent: Sep. 21, 1993

[54] CONTROL ROD SPACER PAD

[75] Inventors: James E. Cearley; Yuen H. Kong, both of San Jose, Calif.

[73] Assignee: General Electric Company, San Jose, Calif.

[21] Appl. No.: 961,771

[22] Filed: Oct. 16, 1992

[51] Int. Cl.$^5$ ............................................. G21C 7/10
[52] U.S. Cl. ................... 376/327; 411/339; 411/353; 411/366; 411/508; 411/913
[58] Field of Search ............... 376/327, 219, 448, 463; 411/338, 339, 352, 353, 366, 508, 509, 510, 913

[56] References Cited

U.S. PATENT DOCUMENTS

| | | | |
|---|---|---|---|
| 2,174,521 | 10/1939 | Lancaster | 411/339 |
| 3,332,850 | 7/1967 | Jonsson et al. | 376/327 |
| 4,006,527 | 2/1977 | Sivachenko | 83/917 |
| 4,257,292 | 3/1981 | Faull | 83/146 |
| 4,400,346 | 8/1983 | Aisaka et al. | 376/327 |
| 4,434,092 | 2/1984 | Mary | 376/260 |
| 4,462,957 | 7/1984 | Fukui et al. | 376/327 |
| 4,543,233 | 9/1985 | Grover et al. | 376/448 |
| 4,643,845 | 2/1987 | Omote et al. | 376/260 |
| 4,747,995 | 5/1988 | Bednarik et al. | 376/260 |
| 4,788,027 | 11/1988 | Krieg | 376/260 |
| 5,040,917 | 8/1991 | Camuffo | 411/338 |

OTHER PUBLICATIONS

Baversten et al., "Replacement of Pins & Rollers on Irradiated Control Rods," ABB Atom Inc., Feb. 1991, pp: cover, 1-6, and FIGS. 1-6.
Asea Atom, "BWR Control Rod Manufacturing," 1987, 4-pages from an apparent brochure.
Morlin et al, "The Ultimate BWR Control Rod," Asea Journal Jan. 1987, pp.: cover and 20-22.
ASEA-Atom, "Long Life Control Rods," 1983, 12-pages.
Morlin et al, "Performance Experience of ASEA-Atom BWR Control Blades," ANS Topical Conference, 21-24 Apr. 1985, pp. 5-29 to 5-42.
General Electric Company, excerpt from a proprietary 19/9/1980 drawing 913E398 showing a "Roller Removal Tool" built and used in 1970's at commercial nuclear plants to remove rollers from control rods.

Primary Examiner—Daniel D. Wasil
Attorney, Agent, or Firm—J. S. Beulick

[57] ABSTRACT

A spacer pad for a nuclear control rod includes first and second halves each including a head and a shank. The shanks are configured for joining together the pad first and second halves, and the shanks are independently locked together for preventing the disassembly thereof. In an exemplary embodiment, the first and second shanks are threadingly joined together, and then independently locked together using a complementary hook and ledge respectively supported by the pad halves which allows assembly together of the pad halves but prevents disassembly thereof.

11 Claims, 6 Drawing Sheets

CONTROL ROD SPACER PAD

The present invention relates generally to nuclear reactors, and, more specifically, to a guide or spacer pad for use in a control rod.

BACKGROUND OF THE INVENTION

In a nuclear reactor such as a boiling water reactor (BWR), a plurality of control rods or blades are selectively inserted into and withdrawn from a reactor core containing nuclear fuel bundles therein. The fuel bundles are disposed in flow or fuel channels which are spaced apart from each other to define passages through which the control rods may be translated upwardly or downwardly. Exemplary control rods have cruciform cross sections which are disposed in complementary shaped passages between adjacent fuel bundles. As the control rods are translated upwardly and downwardly, they intermittently slide against the fuel channels.

In order to reduce abrasion between the sliding control rods and the fuel channels, the control rods typically include pin-mounted rollers which provide the sole points of contact between the control rods and the fuel channels as the control rods are translated. In order to reduce wear of the roller and pins themselves, they are typically formed from conventional abrasion resistant materials containing cobalt. However, it has been determined through operation of the reactors, that the neutron flux within the reactor core irradiates the rollers and pins causing them to become highly radioactive. As the rollers and pins wear and corrode during operation, the particles released thereby remain radioactive and are circulated along with the reactor water channeled through the core. These radioactive particles increase the radiation levels of plant equipment through which the water is circulated.

Accordingly, the cobalt content of rollers and pins is being reduced or eliminated in newer reactors to reduce or eliminate the increased radiation due to the radioactive cobalt particles. However, cobalt-containing rollers and pins are presently in service in nuclear reactors, and the replacement of the entire control rod including the cobalt-containing rollers and pins joined thereto would appear to be impractical and costly.

In order to take advantage of the remaining life of control rods containing the irradiated rollers and pins, machines are presently being considered for removing the rollers and pins remotely underwater without damaging the control rod itself, and then replacing the roller with a new non-cobalt containing roller, or with a guide or spacer pad instead. A spacer pad includes a smooth head which acts as a sliding surface against the fuel channel and is secured through the aperture in the control rod which previously contained the original roller. In one conventional embodiment, the spacer pad includes two mating parts each having a head disposed on opposite sides of the control rod panel and complementary shanks which are swaged or cold rolled together for securely joining the parts together and to the panel. However, cold forming underwater is a difficult process and plastically deforms the shanks which affects their useful lifetime in the reactor.

Another conventional spacer pad has a shank with external threads which is threaded into the panel aperture for securing the spacer pad directly to the panel, and is additionally tack welded thereto to prevent the removal of the spacer pad therefrom. Installation of this assembly underwater is also difficult, and the welding process leaves residual stresses which can also adversely affect the useful life of the spacer pad and control rod.

SUMMARY OF THE INVENTION

A spacer pad for a nuclear control rod includes first and second halves each including a head and a shank. The shanks are configured for joining together the pad first and second halves, and the shanks are independently locked together for preventing the disassembly thereof. In an exemplary embodiment, the first and second shanks are threadingly joined together, and then independently locked together using a complementary hook and ledge respectively supported by the pad halves which allows assembly together of the pad halves but prevents disassembly thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
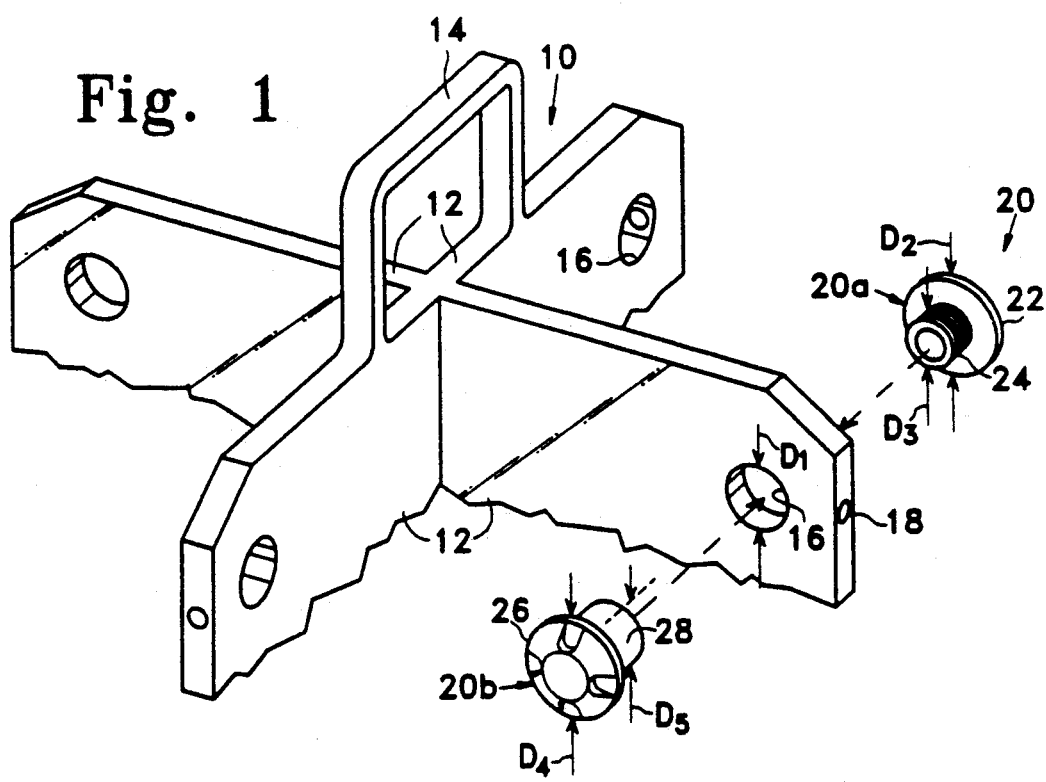
FIG. 1 illustrates the top of a conventional cruciform control rod for a nuclear reactor including four intersecting panels each having an aperture for originally containing a pin-mounted roller.

Illustrated schematically in FIG. 1 is the top portion of a conventional cruciform control rod 10 for use between fuel bundles in a nuclear reactor core (not shown). The control rod 10 in this exemplary embodiment includes four identical, equiangularly spaced apart panels 12 which intersect each other to define the cruciform configuration of the control rod 10. A conventional handle 14 extends upwardly from two of the panels 12. Each of the panels 12 includes an aperture 16 having a diameter $D_1$ in which was originally disposed a roller (not shown) mounted therein by a conventional pin 18, only a portion of which is shown. The roller has been removed from the control rod 10 by any suitable means such as by shearing the pin 18 by impacting the roller. This leaves portions of the pin 18 remaining in the panel 12 since the pin 18 is welded at its outer end to the edge of the panel 12, and its inner end is contained in a blind hole.

Instead of replacing the removed roller with a new, non-cobalt containing roller for taking advantage of the remaining useful life of the control rod 10, a spacer pad, or assembly, 20 is instead mounted through the aperture 16 and permanently secured to the panel 12 in accordance with a first embodiment of the present invention. The spacer pad 20 includes a first half or part 20a which is joined to a second half or part 20b in accordance with the present invention. The two halves 20a, 20b may be manually joined together, or may be joined together by a suitable machine which is not the subject of the present invention. Identical spacer pads 20 may be installed in all of the panel apertures 16 at the top of the control rod 10 for refurbishing the control rod 10 to be used again for the remainder of its useful life in the reactor core. Although the present invention provides an improved spacer pad 20 for use in a previously used control rod 10 from which the original rollers have been removed, it may also be used in a new control rod designed specifically for receiving the improved spacer pad 20.

Referring again to FIG. 1, the first half 20a includes an annular first head 22 having an outer diameter $D_2$, and an integral, annular first shank 24 extending from the first head 22 and having an outer diameter $D_3$ which is less than the diameter $D_2$ of the first head 22. Similarly, the second half 20b includes an annular second head 26 having an outer diameter $D_4$, and an integral, annular second shank 28 extending therefrom and having an outer diameter $D_5$ which is less than the diameter $D_4$ of the second head 26. FIG. 1 illustrates in exploded fashion the two pad halves 20a, 20b prior to assembly to the panel 12 through the aperture 16 as indicated by the assembly arrows shown in phantom.

Figure 2:
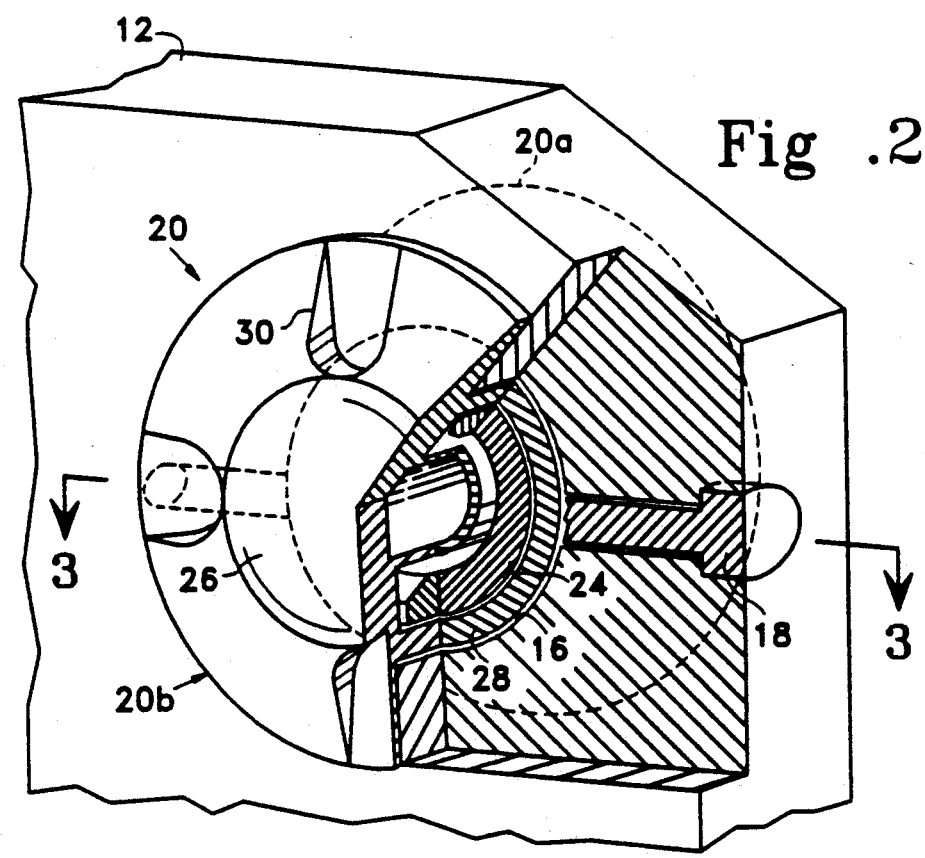
FIG. 2 is an enlarged, partly sectional view of one of the panels illustrated in FIG. 1 containing a spacer pad joined thereto in accordance with one embodiment of the present invention.
Figure 3:
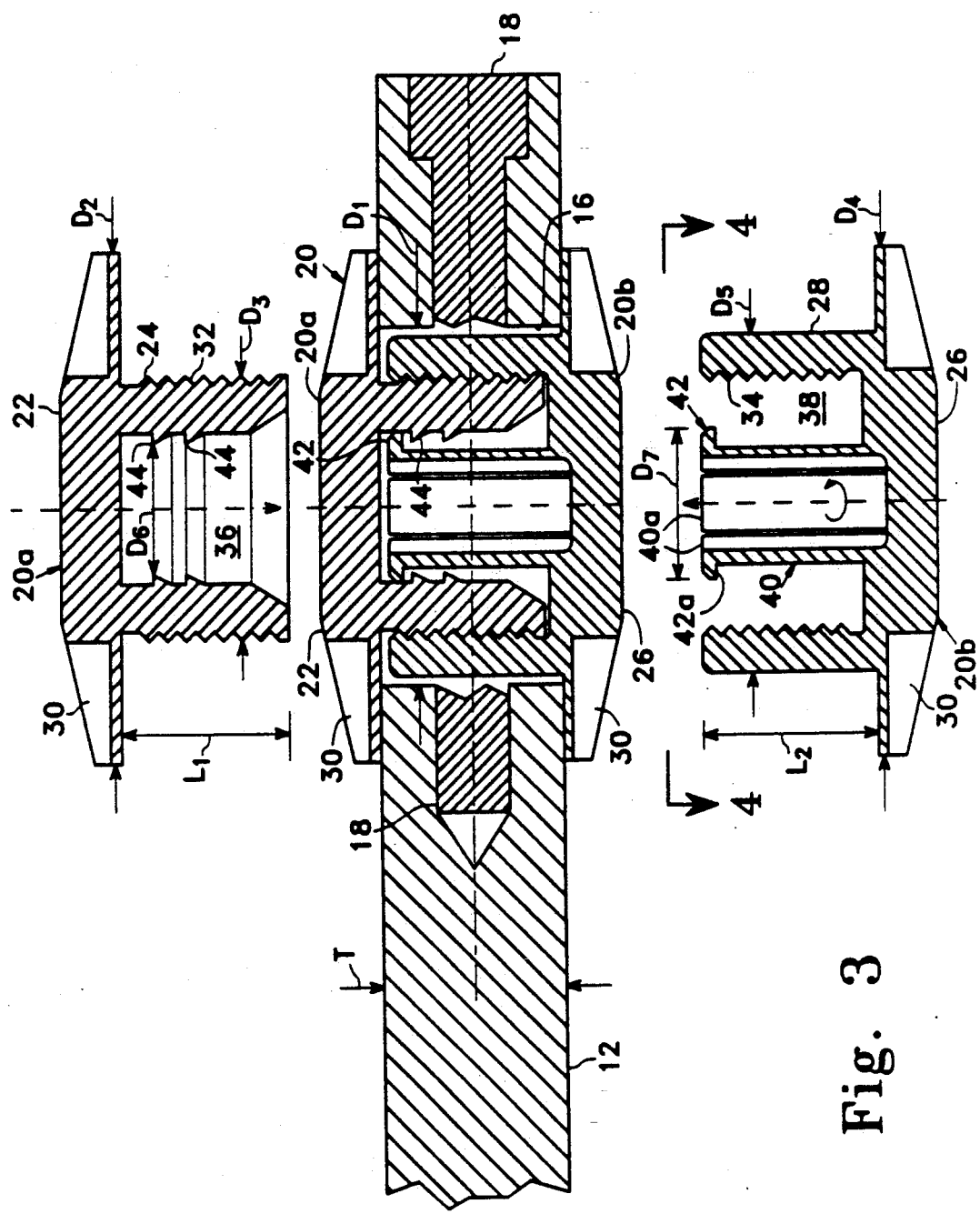
FIG. 3 is a transverse sectional view of the first embodiment of the spacer pad illustrated in FIG. 2 taken along line 3—3 showing spacer pad first and second halves before and after assembly to the control rod panel.

FIG. 2 illustrates an exemplary spacer pad 20 assembled to the control rod panel 12 through a respective aperture 16, which is additionally shown in FIG. 3 along with the initial, unassembled positions of the spacer pad halves 20a, 20b. Each of the heads 22, 26 has a smooth center portion or hub which provides the sliding surface for contact with adjacent fuel channels of fuel bundles (not shown) from which hubs extend radially outwardly a plurality of circumferentially spaced apart indentations or recesses in the heads 22, 26. The recesses 30 may be used for holding and rotating the pad halves 20a, 20b during assembly. The heads 22, 26 may take any suitable form including that shown in the Figures in this preferred embodiment, or may be hexagonal, for example, for providing a bolt-like configuration for handling by a suitable chuck or socket.

Referring to FIG. 3, the spacer pad 20 includes means for releasably joining the first shank 24 to the second shank 28, which, in the preferred embodiment illustrated, comprise conventional first screw threads 32 on the first shank 24, and complementary conventional second screw threads 34 on the second shank 28 for threadingly joining together the first and second shanks 24, 28. In the first embodiment illustrated in FIG. 3, the first shank 24 is tubular and has an inner first cavity 36, with the first threads 32 being disposed externally on the first shank 24. The second shank 28 is also tubular and has an inner second cavity 38, with the second threads 34 being disposed internally in the second cavity 38 on the second shank 28 so that the second shank 28 is threadingly engagable around the outside of the first shank 24 with the first and second threads 32, 34 engaging each other.

Accordingly, the first and second threads 32, 34 are effective for allowing the first and second shanks 24, 28 to be forward rotated, for example with the pad second half 20b being rotated clockwise as shown by the arrow in FIG. 3 relative to the pad first half 20a for the assembly thereof by being screwed together. The spacer pad halves 20a, 20b are screwed together until the inner surfaces of the first and second heads 22, 26 abut the outer surfaces of the panel 12. Both the outer diameter $D_2$, $D_4$ of the first and second heads 22, 26 are suitably larger than the diameter $D_1$ of the panel aperture 16 for providing suitable contact area therebetween. The outer diameter $D_5$ of the second shank 28 is suitably less than the diameter $D_1$ of the aperture 16 for allowing the second shank 28 to be inserted therein with a suitable assembly clearance therebetween. And, the outer diameter $D_3$ of the first shank 24 is selected for allowing the first and second threads 32, 34 to engage, with the first shank 24 being translatable fully inside the second cavity 38.

In this preferred first embodiment, the first shank 24 has a longitudinal first length $L_1$ from its distal end to the first head 22, and the first threads 32 extend along the first shank 24 for substantially all of the first shank length $L_1$. Similarly, the second shank 28 has a longitudinal second shank length $L_2$ from its distal end to the second head 26, and the second threads 34 extend along the second shank 28 inside the second cavity 38 for substantially all of the second shank length $L_2$. The first and second shank lengths $L_1$, $L_2$ are suitably smaller than the thickness T of the panel 12 for allowing the pad halves 20a, 20b to be completely threaded together during assembly for maximizing the contact area of the first and second threads 32, 34 across the thickness T of the panel 12. The first and second threads 32, 34 are also located radially outwardly from the centerline of the spacer pad 20 and as close as practical to the inner surface of the panel aperture 16 for increasing the circumference at the intersecting first and second threads 32, 34 for maximizing the amount of torque which may be applied to the pad halves 20a, 20b for rigidly clamping the pad halves 20a, 20b together and against the outer surfaces of the panel 12. The pad halves 20a, 20b are suitably torqued together to ensure effective retention with the panel 12 during operation of the control rod 10 in the nuclear reactor core which is subject to varying temperatures causing expansion and contraction of the panel 12 relative to the spacer pad 20. It is noted that although in the preferred embodiment the first and second threads 32, 34 are utilized, other means for joining together the first and second shanks 24, 28 with suitable torque may be used, such as conventional bayonet-type couplings if desired.

However, although the first and second threads 32, 34 allow the pad halves 20a, 20b to be readily joined together by screwing, suitable means are also provided in accordance with the present invention for self-locking the first shank 24 to the second shank 28 independently of the first and second threads 32, 34 for preventing disassembly of the threads 32, 34 during operation, and, therefore, preventing disassembly of the pad first and second halves 20a, 20b once they are initially assembled together.

In the first embodiment illustrated in FIG. 3, the means for locking together the first and second shanks 24, 28 include a central annular post 40 extending outwardly from the second head 26 concentrically inside the second cavity 38, which post 40 is integral with the second head 26. The post 40 includes an annular hook 42 at a distal end thereof which is effective for latching onto an annular ledge 44 extending radially inwardly from the first shank 24 inside the first cavity 36. Two longitudinally spaced apart ones of the ledges 44 are illustrated for example to successively lock together the pad halves 20a, 20b during the assembly thereof. Each of the ledges 44 is configured for latching or abutting the hook 42 to prevent disassembly of the first and second shanks 24, 28. The hook 42 and the ledge 44 are effective for preventing unlimited reverse rotation, or counterclockwise rotation, between the first and second shanks 24, 28 to prevent disassembly of the first and second shanks 24, 28. In this way, the first and second threads 32, 34 allow the pad halves 20a, 20b to be relatively easily screwed together during assembly, and upon full assembly thereof, the hook 42 is positioned above the top ledge 44 in the first cavity 36 adjacent to the first head 22 to prevent the pad halves 20a, 20b from being disassembled during operation due to thermal expansion and contraction or vibration which occurs in the environment of the nuclear reactor core.

Figure 4:
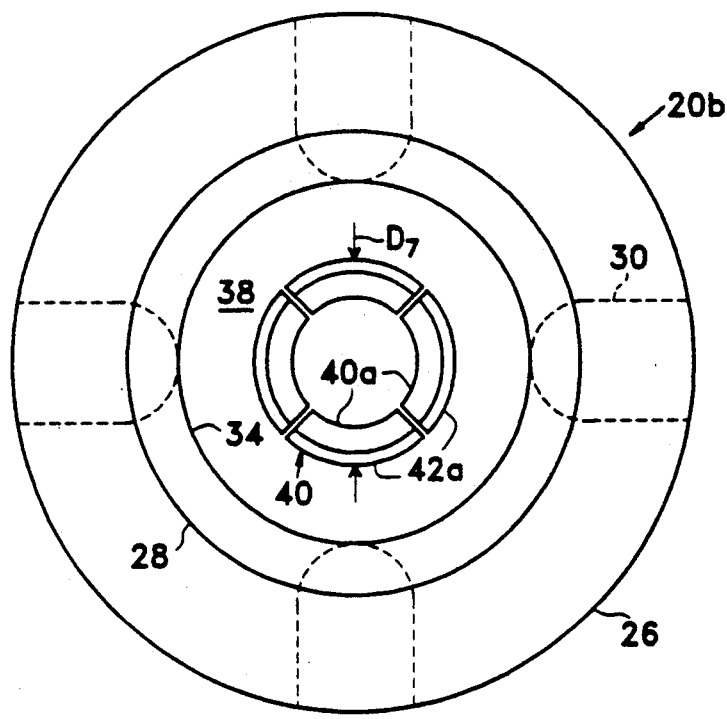
FIG. 4 is an end view of the spacer pad second half illustrated in FIG. 3 taken along line 4—4.

Referring again to FIG. 3, the ledge 44 is preferably integrally joined to the first shank 24 in the first cavity 36 and has an inner diameter $D_6$. Referring to both FIGS. 3 and 4, the post 40 is preferably tubular and includes a plurality of circumferentially spaced apart longitudinal fingers 40a, four being shown, each having a hook portion 42a in the form of a generally L-shaped radially outwardly extending distal end of the fingers 40a. The fingers 40a are cantilevered from the second head 26 and are, therefore, laterally resilient and configured for deflecting radially inwardly for clearing the ledges 44 as the first and second shanks 24, 28 are screwed together, and returning to an undeflected position upon full assembly of the pad first and second halves 20a, 20b for positioning the hook portions 42a adjacent to the top ledge 44 to prevent disassembly of the pad first and second halves 20a, 20.

Figure 5:
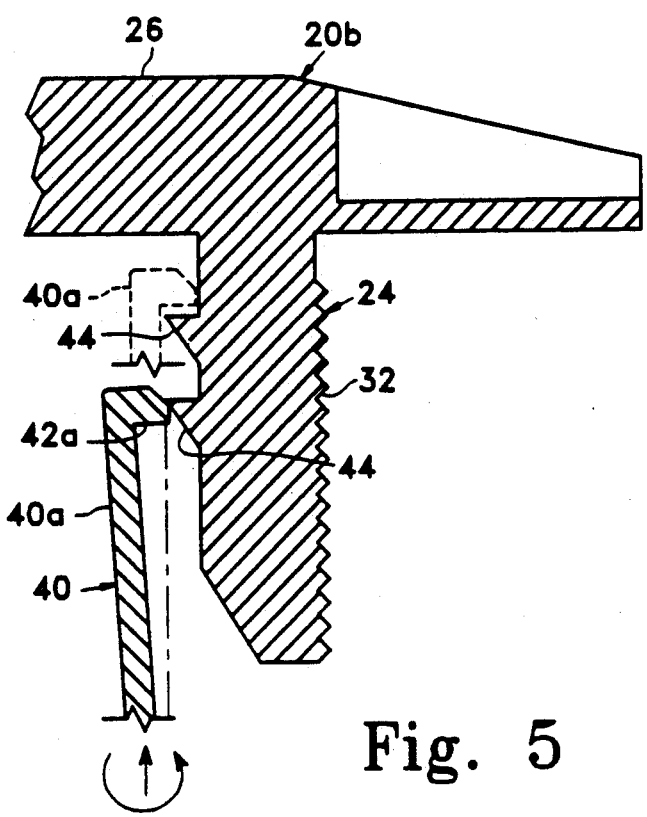
FIG. 5 is a longitudinal sectional view of a portion of the spacer pad first and second halves showing assembly of a respective hook and ledge thereof for locking together the two halves.

More specifically, the outer diameter $D_7$ of the hook 42 relative to the centerline axis of the pad second half 20b as illustrated in FIG. 3 is preferably larger than the inner diameter $D_6$ of the ledges 44. Accordingly, and referring to FIG. 5, as the pad second half 20b is rotated in threading engagement with the pad first half 20a, and therefore translates toward the pad first half 20a, the hook portions 42a are caused to resiliently deflect radially inwardly as they slide against the ledges 44 as shown in solid line, and upon clearing the ledges 44, the fingers 40a elastically return to their original undeflected position as shown in phantom line with the bottom of each hook portion 42a being disposed above the top of each ledge 44 in turn which prevents downward, or removal, translation of the fingers 40a relative to the ledges 44. The hook portions 42a and the ledges 44 preferably have complementary inclined surfaces which act as cam surfaces for allowing the ledge 44 to push the hook portions 42a radially inwardly as the fingers 40a are translated upwardly as shown in FIG. 5, and also have complementary, horizontal flat surfaces which provide locking between the hook portions 42a and the ledges 44. As shown in FIG. 5, the hook portions 42a first clear the lower ledge 44 during assembly, and then clear the top ledge 44 upon full assembly of the pad halves 20a, 20b to prevent the disassembly thereof. One or more ledges 44 may be used as desired to prevent disassembly.

Accordingly, the spacer pad halves 20a, 20b may be relatively easily threaded together by rotating either one or both of the pad halves 20a, 20b relative to each other, with the first and second threads 32, 34 providing the primary means to join together the two halves 20a, 20b, with the hook portions 42a and ledge 44 providing a secondary retention, or self-locking means to prevent unlimited reverse rotation between the pad halves 20a, 20b for preventing the disassembly thereof during operation. As shown in FIG. 3, a suitable vertical clearance is preferably provided between the hook 42 and the top ledge 44 to ensure engagement therebetween. This clearance will allow a small amount of reverse rotation only until the hook bottoms-out on the top of the ledge 44 which prevents further disassembly movement between the two halves 20a, 20b.

Figure 6:
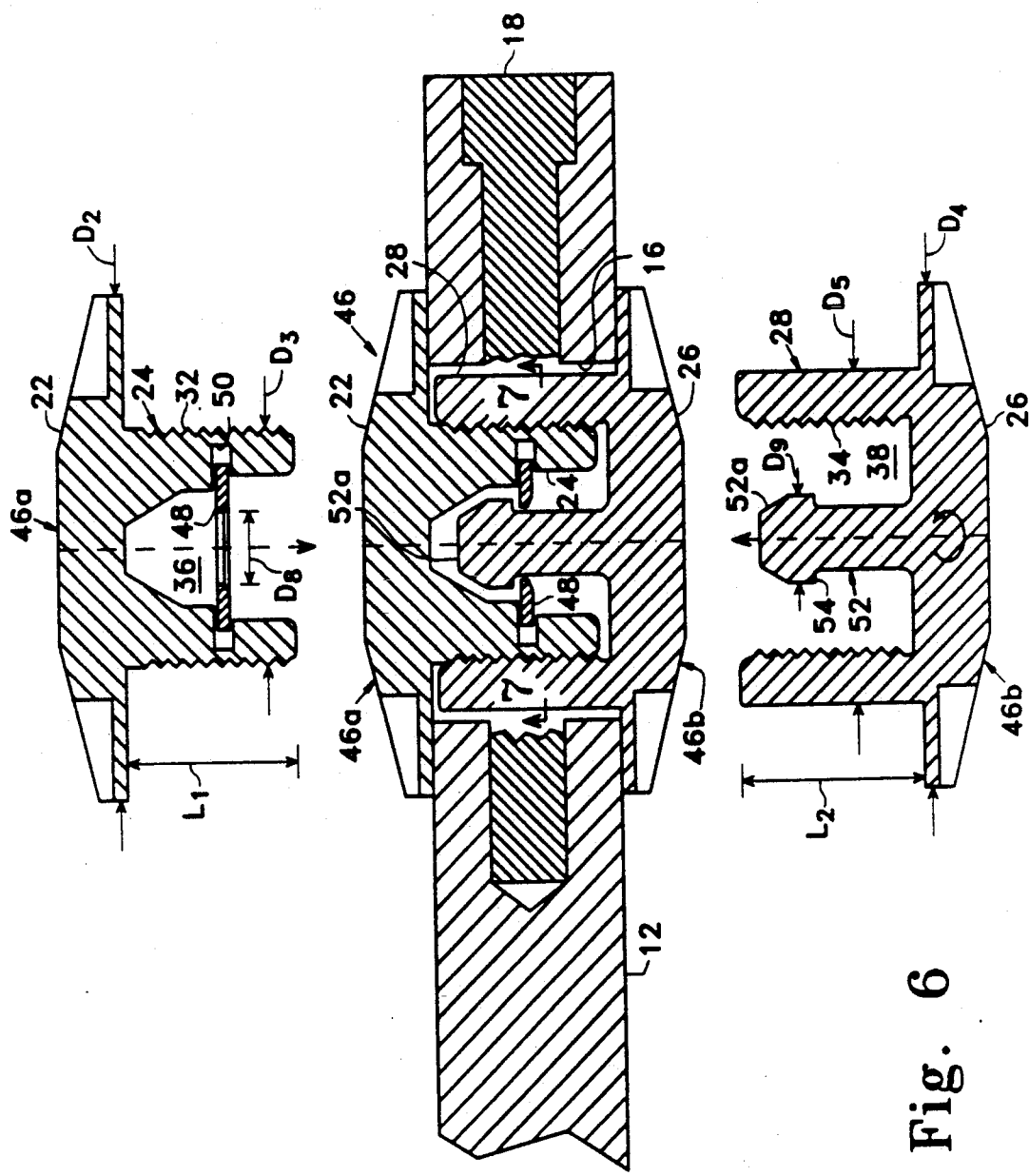
FIG. 6 is a sectional view like FIG. 3 illustrating a spacer pad in accordance with a second embodiment of the present invention.

Illustrated in FIG. 6 is a spacer pad in accordance with a second embodiment of the present invention which is substantially identical to the spacer pad 20 illustrated in FIG. 3 but designated 46 in this second embodiment. Similar elements are referred to by the same reference numerals used in the first embodiment described above and include the first and second heads 22, 26; the first and second shanks 24, 28; the first and second cavities 36, 38; and the first and second threads 32, 34, for example. The primary joining means remains the first and second threads 32, 34 for allowing the first and second pad halves 46a, 46b to be suitably screwed together as described above with respect to the first embodiment. However, the self-locking means for preventing disassembly of the spacer pad 46 upon being fully assembled includes a ledge in the form of an annular split ring 48 having an inner diameter $D_8$ and slidably disposed in a complementary annular slot 50 in the first shank 24 within the first cavity 36 of the pad first half 46a. Also in this second embodiment, the post, designated 52, includes an enlarged conical head 52a having a maximum outer diameter $D_9$ which defines an annular hook designated 54. The head outer diameter $D_9$ is greater than the ring inner diameter $D_8$ for resiliently enlarging the split ring 48 as the first and second shanks 24, 28 are screwed together, and for overlapping the ring 48 upon full assembly of the pad first and second halves 46a, 46b to prevent disassembly thereof.

Figure 7:
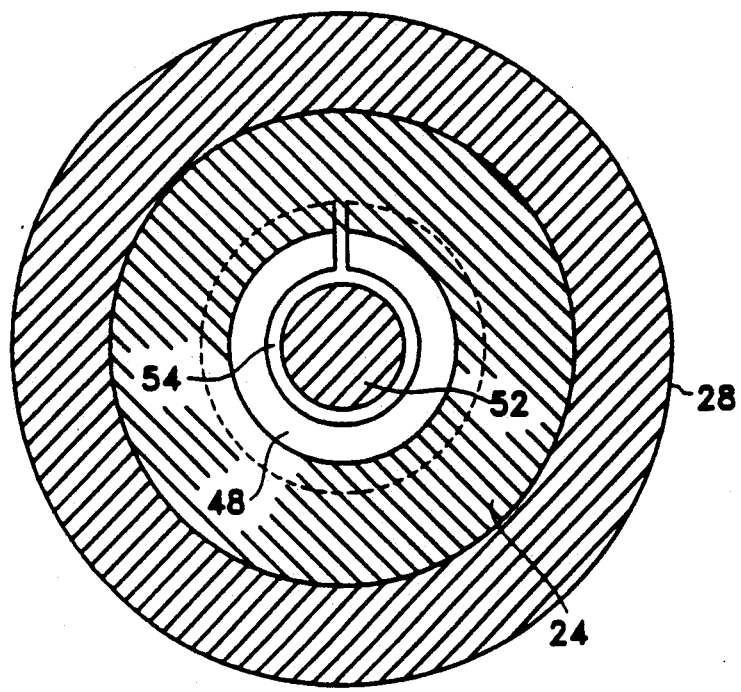
FIG. 7 is a partly sectional view of the spacer pad illustrated in FIG. 6 taken along line 7—7.
Figure 8:
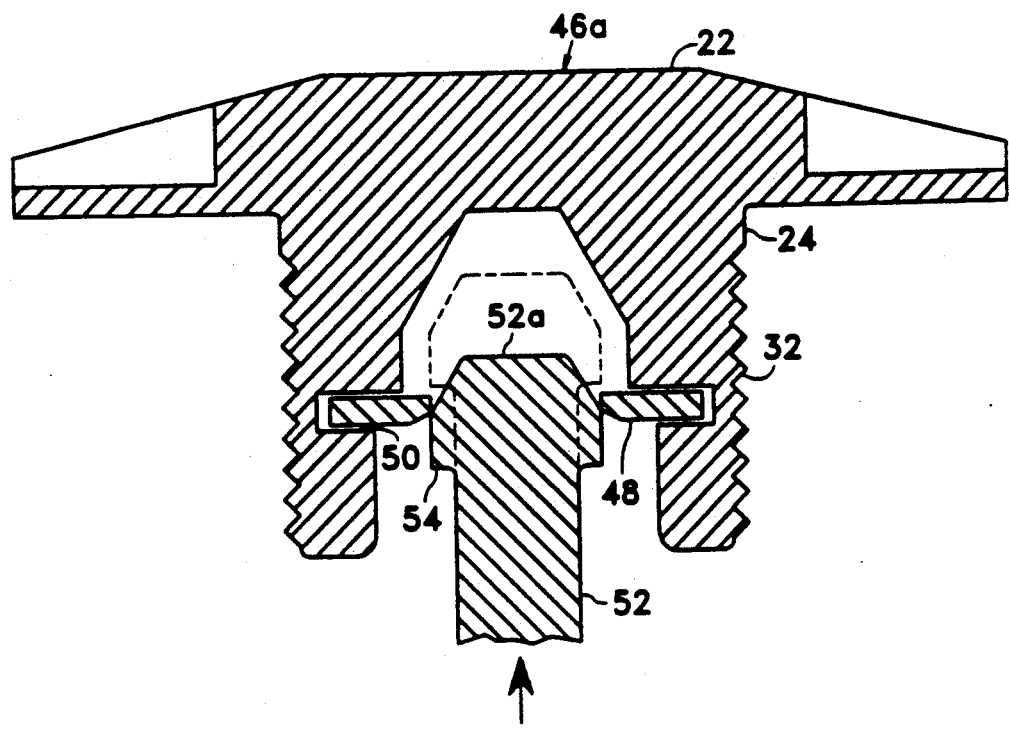
FIG. 8 is a longitudinal sectional view of a first half of the spacer pad illustrated in FIG. 6 and a portion of a second half of the spacer pad showing assembly of a respective hook and ledge for locking together the two halves.

More specifically, FIGS. 6 and 7 illustrate the fully assembled pad halves 46a, 46b with the post head 52a being disposed above, or on one side of the split ring 48 which prevents its disassembly thereof. In FIG. 8, the post 52 is shown in solid line as it is translated upwardly into the pad first half 46a as the pads 46a, 46b are rotated relative to each other, with the post head 52a urging radially outwardly, or expanding, the split ring 48 as the head 52a is translated. Once the head 52a passes the top of the split ring 48, the split ring 48 contracts to its undistorted position, as shown in the center of FIG. 6, which prevents retraction of the post head 52, and therefore, disassembly of the pad halves 46a, 46b. The upper surface of the post head 52a is preferably conical, and the lower radially inner surface of the split ring 48 is preferably complementarily configured for providing mating cam surfaces which allows the post head 52a to expand the split ring 48 as the head 52a is pushed therethrough. The surfaces of the post head 52a defining the hook 54 and the top of the split ring 48 are preferably flat and complementary horizontal surfaces to prevent withdrawal of the post head 52a once it has been translated above the top of the split ring 48.

The second embodiment of the spacer pad 46 illustrated in FIGS. 6-8 enjoys the relatively simple joining together of the pad halves using the first and second threads 32, 34 and the relatively large torque capability thereof as described above, but provides an alternate locking arrangement using the enlarged post head 52a and the split ring 48 instead of the resilient fingers 40a and ledges 44 described above.

Figure 9:
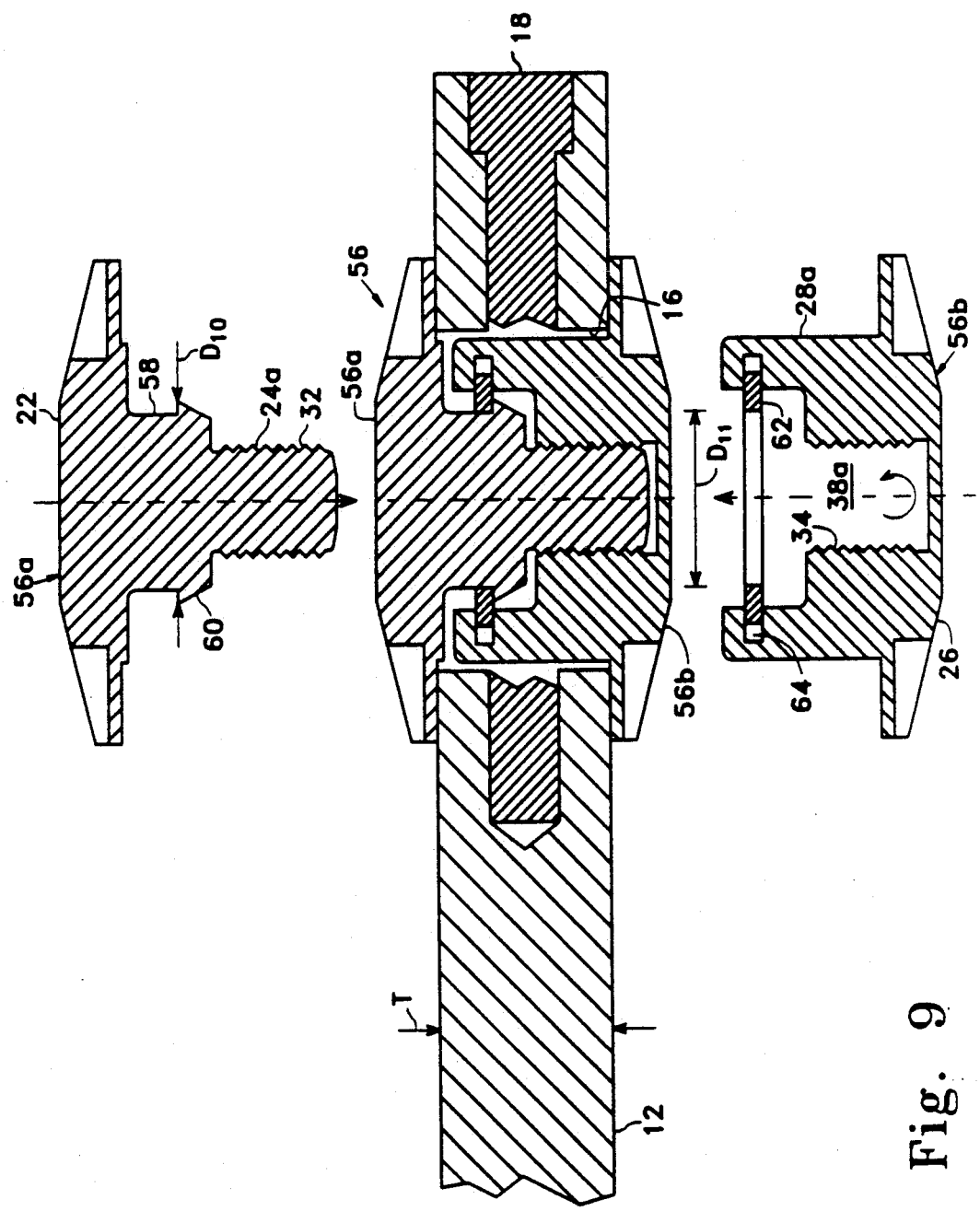
FIG. 9 is a sectional view like FIG. 3 illustrating a spacer pad in accordance with a third embodiment of the present invention.

Illustrated in FIG. 9 is a spacer pad in accordance with a third embodiment of the present invention designated 56. In this third embodiment, the pad first half 56a includes an identical first head 22 as described above, and the pad second half 56b includes a substantially identical second head 22 as described above. However in this embodiment, the central annular post 58 extends coaxially from the first head 22 and includes an annular hook 60 at a distal end thereof. The first shank 24a extends coaxially from the post 58 and includes the external first threads 32 thereon. The second shank 28a extending from the second head 26 of the pad second half 56b is preferably tubular and has an inner cavity 38a. The annular ledge of the locking means is in the form of a split ring 62, substantially identical to the split ring 48 described above, which is slidably disposed in a complementary annular slot 64 in the second shank 28a within a distal end of the inner cavity 38a. The ring 62 has an inner diameter $D_{11}$ which is less than the outer diameter $D_{10}$ of the post hook 60 so that the post hook 60 resiliently enlarges the ring 62 as the first and second shanks 24a, 28a are joined together, and for overlapping the ring 62 upon full assembly of the pad first and second halves 56a, 56b to prevent disassembly thereof in the same fashion as described above for the post 52 and the split ring 48.

Also in this embodiment, the second cavity 38a has a proximal end joined to its distal end which includes the second threads 34 therein for threadingly receiving the first threads 32 on the first shank 24a. In this third embodiment, the first and second threads 32, 34 do not extend across the entire thickness T of the panel 12 as in the first and second embodiments described above since the first shank 24a extends from the end of the post 58. The outer diameter of the first shank 24a is relatively small compared to the outer diameter $D_3$ described above and, therefore, limits the amount of torque and resulting clamping forces which may be generated by the pad first and second halves 56a, 56b against the outer surfaces of the panel 22 upon final assembly.

In all of the above three embodiments, the respective spacer pads 20, 46, 56 may be assembled to the control rod 10, with the respective first and second shanks thereof being joined together through the panel aperture 16, with the respective first and second heads 22, 26 abutting the panel 12 on opposite sides thereof to provide a smooth surface for rubbing or sliding against adjacent fuel channels surrounding fuel bundles as the control rods 10 are inserted into and withdrawn from the reactor core during normal operation. The several spacer pads in accordance with the present invention are, therefore, relatively easily assembled, even underwater, to the control rod 10 without the need for welding or cold roll-forming for securely locking together the pad halves to each other and to the control rod panels 12.

Although resilient fingers 40a and split rings, e.g. 48, 62, have been disclosed above as means for positively self-locking together the pad halves, other self-locking arrangements may also be used including for example suitable circumferential ratchets.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A nuclear reactor control rod spacer pad for being mounted through an aperture in a panel of a nuclear control rod, comprising:
   a first half including a first head and a first shank extending therefrom;
   a second half including a second head and a second shank extending therefrom;
   means for joining said first shank to said second shank; and
   means for locking said first shank to said second shank independently of said joining means for preventing disassembly of said joining means.

2. A spacer pad according to claim 1 wherein said joining means are effective for allowing said first and second shanks to be forward rotated relative to each other for assembly thereof, and said locking means are effective for preventing unlimited reverse rotation between said first and second shanks to prevent disassembly thereof.

3. A spacer pad according to claim 2 wherein said joining means comprise first threads on said first shank, and complementary second threads on said second shank for threadingly joining together said first and second shanks.

4. A spacer pad according to claim 3 wherein said first threads are disposed externally on said first shank, and said second threads are disposed internally on said second shank.

5. A spacer pad according to claim 4 wherein:
   said first shank has a first shank length from a distal end thereof to said first head, and said first threads extend along said first shank for substantially all said first shank length; and
   said second shank has a second shank length from a distal end thereof to said second head, and said second threads extend along said second shank for substantially all said second shank length.

6. A spacer pad according to claim 5 wherein:
   said first shank is tubular and has an inner first cavity; and
   said second shank is tubular and has an inner second cavity containing said second threads, and is threadingly engagable around said first shank.

7. A spacer pad according to claim 6 wherein said locking means comprise:
   a post extending from said second head inside said second cavity, and including a hook at a distal end thereof; and
   an annular ledge extending from said first shank inside said first cavity, said ledge being configured for latching said hook to prevent disassembly of said first and second shanks.

8. A spacer pad according to claim 7 wherein:
said ledge is integral with said first shank in said first cavity; and
said post includes a plurality of circumferentially spaced apart fingers each having a hook portion, said fingers being laterally resilient and configured for deflecting inwardly for clearing said ledge as said first and second shanks are screwed together, and returning to an undeflected position upon assembly of said pad first and second halves for positioning said hook portions adjacent to said ledge to prevent disassembly of said pad first and second halves.

9. A spacer pad according to claim 7 wherein:
said ledge is an annular split ring having an inner diameter and being slidably disposed in an annular slot in said first shank within said first cavity; and
said post includes an enlarged head having an outer diameter and defining said hook, said head outer diameter being greater than said ring inner diameter for resiliently enlarging said split ring as said first and second shanks are screwed together, and for overlapping said ring upon assembly of said pad first and second halves to prevent disassembly thereof.

10. A spacer pad according to claim 7 in combination with said nuclear control rod, said first and second shanks being joined together through said panel aperture, with said first and second heads abutting said panel on opposite sides thereof.

11. A spacer pad according to claim 4 wherein:
said second shank is tubular and has an inner cavity;
said locking means comprise:
a post extending from said first head and including a hook at a distal end thereof; and
an annular ledge in the form of a split ring slidably disposed in an annular slot in said second shank within a distal end of said inner cavity, said ring having an inner diameter less than an outer diameter of said post hook so that said post hook resiliently enlarges said ring as said first and second shanks are joined together, and for overlapping said ring upon assembly of said pad first and second halves to prevent disassembly thereof;
said first shank extends from said post; and
said second shank cavity has a proximal end joined to said distal end thereof and includes said second threads for threadingly receiving said first threads on said first shank.

* * * * *